United States Patent
Hobelsberger

(10) Patent No.: US 9,293,955 B2
(45) Date of Patent: Mar. 22, 2016

(54) EXCITATION DEVICE

(75) Inventor: Max Hobelsberger, Würenlingen (CH)

(73) Assignee: ALSTOM TECHNOLOGY LTD, Baden (CH)

( * ) Notice: Subject to any disclaimer, the term of this patent is extended or adjusted under 35 U.S.C. 154(b) by 436 days.

(21) Appl. No.: 13/535,742

(22) Filed: Jun. 28, 2012

(65) Prior Publication Data

US 2013/0033238 A1 Feb. 7, 2013

(30) Foreign Application Priority Data

Jun. 29, 2011 (EP) .................................. 11171988

(51) Int. Cl.
| | |
|---|---|
| *H02K 11/00* | (2006.01) |
| *H02P 9/14* | (2006.01) |
| *H02K 3/04* | (2006.01) |
| *H02K 19/26* | (2006.01) |
| *H02M 7/48* | (2007.01) |
| *H02P 27/08* | (2006.01) |
| *H02P 25/08* | (2006.01) |
| *H02P 3/18* | (2006.01) |

(52) U.S. Cl.
CPC .............. *H02K 3/04* (2013.01); *H02K 11/0068* (2013.01); *H02K 11/0073* (2013.01); *H02K 19/26* (2013.01); *H02M 7/48* (2013.01); *H02P 27/08* (2013.01); *H02P 3/18* (2013.01); *H02P 9/14* (2013.01); *H02P 25/085* (2013.01)

(58) Field of Classification Search
CPC ... H02K 11/068; H02K 11/0073; H02K 3/04; H02K 19/26; H02P 3/18; H02P 9/14; H02P 25/085; H02P 27/08; H02P 2201/09; H02P 2207/05; H02M 7/48

USPC .................. 310/162, 164, 165, 198; 322/63; 318/720; 324/546
IPC ........................... H02K 11/00,3/04; H02P 9/14
See application file for complete search history.

(56) References Cited

U.S. PATENT DOCUMENTS

| | | | | |
|---|---|---|---|---|
| 4,467,233 | A * | 8/1984 | Moren et al. .................. | 310/162 |
| 5,304,883 | A * | 4/1994 | Denk ........................ | H02K 3/04 |
| | | | | 174/DIG. 19 |
| 6,236,135 | B1 * | 5/2001 | Suzuki ...................... | H02K 3/46 |
| | | | | 310/162 |
| 6,469,469 | B1 * | 10/2002 | Chambers ............... | H02P 23/08 |
| | | | | 318/801 |

(Continued)

FOREIGN PATENT DOCUMENTS

| | | |
|---|---|---|
| EP | 0266598 A2 | 5/1988 |
| WO | 8300851 A1 | 3/1983 |

OTHER PUBLICATIONS

Rashid, "Power Electronics Handbook", Academic Press, 2001.*

(Continued)

*Primary Examiner* — John K Kim
(74) *Attorney, Agent, or Firm* — Buchanan Ingersoll & Rooney PC

(57) ABSTRACT

In an excitation device for stators of generators for high-induction measurement, the greatest possible compensation of the reactive power requirement is achieved. Depending on the size and energy requirement of the generator, a number of individual excitation modules with a corresponding number of individual excitation windings are provided, wherein a minimum necessary total excitation current can be supplied by superimposing the individual currents of the excitation windings.

11 Claims, 2 Drawing Sheets

(56) References Cited

U.S. PATENT DOCUMENTS

| | | | |
|---|---|---|---|
| 7,049,786 B1* | 5/2006 | Toliyat | H02P 3/18 318/254.1 |
| 7,145,280 B2* | 12/2006 | Noble | H02K 1/06 29/596 |
| 7,375,499 B2* | 5/2008 | Maddali | H02P 27/06 322/28 |
| 7,538,524 B2* | 5/2009 | Sullivan | H02K 3/04 310/154.01 |
| 2004/0070404 A1* | 4/2004 | Lee | G01R 31/34 324/545 |
| 2005/0275386 A1 | 12/2005 | Jepsen et al. | |
| 2006/0132081 A1* | 6/2006 | Clothier et al. | 318/701 |
| 2009/0295247 A1* | 12/2009 | Okamoto | H02K 31/00 310/156.37 |
| 2013/0033238 A1* | 2/2013 | Hobelsberger | 322/63 |

OTHER PUBLICATIONS

Stefan Vosskühler, Stefan Lanz: "Die Bedeutung von Diagnosemessungen für die Zustandsbewertung von Generatoren am Beispiel der Verlustfaktor- und Hochinduktionsprüfung", ETG-Kongress 2009, 4.22, Oct. 27, 2009.

Anonymous: "ETG-Fachbericht 119—Inhaltsverzeichnis", Gemeinsamen Bibliotheksverbundes Internationaler ETG-Kongress 2009, Oct. 27, 2009.

* cited by examiner

EXCITATION DEVICE

RELATED APPLICATIONS

The present application hereby claims priority under 35 U.S.C. Section 119 to European Patent application number 11171988.6, filed Jun. 29, 2011, the entire contents of which are hereby incorporated by reference.

FIELD OF THE INVENTION

The present disclosure relates to an excitation device for stators and generators for high-induction measurement.

BACKGROUND

Excitation devices of this kind are used, for example, in the so-called high-induction testing of stators of large power station generators. For this type of testing, the stator is excited at mains frequency to a magnetic induction of approximately 1.5 Tesla.

The technical situation relating to high-induction stator measurement on power station generators in particular will be discussed here.

By this measuring process, the stator of a generator is magnetically excited by means of excitation coils and an alternating electrical current flowing through these coils. A conventional device is shown in FIG. 1. The figure shows the annular stator of a hydro generator in schematic form. The rotor is removed for this test. The windings of an excitation coil are arranged around this stator ring. For large stator diameters, individual coil segments are typically distributed symmetrically along the stator circumference for this purpose.

The excitation coil is operated with alternating voltage at mains frequency. With large generators, considerable voltages and currents and a large inductive reactive power are required in order to achieve the required nominal induction of 1.5 Tesla. Typical voltage values are several kV at a current strength of several kA, which means a reactive power requirement of several MVAr (energy content approx. 450 J/m$^3$ and reactive power 2*50*450 Ws/s=45 kVAr/m$^3$). This high reactive power requirement is one of the main problems when carrying out this measurement.

The electrical energy source (mains connection or generator) is often unable to supply this high unbalanced load. Furthermore, the high voltages used are basically hazardous to life, which means a significant outlay for safety measures. For these reasons, the measurement is very laborious. However, it is a compulsory requirement by many customers, especially in the acceptance testing of new generators after fabrication.

The reactive power requirement can be reduced by compensation by means of capacitors. However, there is then still the problem of high voltages, as the winding does not usually consist of one turn but has to be distributed around the circumference of the stator by means of a plurality of turns in order to effect a uniform field strength distribution.

A further solution consists in using an electronic power converter for supplying the excitation winding. The reactive power requirement of the excitation coil can be compensated by means of a suitably sized link circuit for the supply of energy. An advantage of this solution is that all load cases up to a maximum reactive power requirement can be covered. However, with this solution there is the problem that the converter has to be rated for the highest possible load case, which gives rise to relatively high costs. This rating relates in particular to the link circuit, which must absorb the reactive energy, and also to the electronic output components, which must withstand high voltages and currents.

Moreover, high voltages and currents which can endanger personnel are again present in the excitation coil.

SUMMARY

The present disclosure is directed to an excitation device for stators and generators for high-induction measurement with the greatest possible compensation of the reactive power requirement. Depending on the size and energy requirement of the generator, a plurality of individual excitation modules with a corresponding plurality of individual excitation windings are provided. The necessary total excitation current is provided by superimposing individual currents of the excitation windings.

BRIEF DESCRIPTION OF THE DRAWINGS

The invention is described in more detail below with reference to the figures. All elements which are not important for the immediate understanding of the invention have been omitted. Identical elements in the different figures are given the same references. In the drawings.

The physical particulars and quantities in FIGS. 1 to 4 are shown with the internationally applicable and usual designations for better understanding by the person skilled in the art. The introduction of references for the individual physical particulars and quantities would make the description unnecessarily difficult to understand.

DETAILED DESCRIPTION OF THE PREFERRED EMBODIMENTS INTRODUCTION

The invention, as described in the appended claims, is based on the object of proposing an improved device for the excitation which requires little reactive power from the energy source, which manages with lower supply voltages and supply currents, which produces lower voltages and currents at the outputs and is therefore less dangerous, and which is flexible in application, i.e. suitable for a multiplicity of load cases.

The device according to the invention provides a cost-effective, flexible and far less dangerous excitation device for stators of generators for high-induction measurement, and also substantially compensates the reactive power requirement.

The solution of the problem according to the invention is achieved by the use of a modular design of the overall excitation system. Depending on the size and excitation requirement of the generator, a number of individual excitation modules, hereinafter also referred to as individual modules for short, are used together with a corresponding number of individual excitation windings, which in totality supply the necessary excitation current by superimposing the individual currents.

Each of the individual modules supplies part of the total excitation current required via its own excitation winding, which consists of a number of dedicated excitation turns. The current feeds to the individual modules are controlled and synchronized with one another so that the required total current flows with the required time characteristic by superimposing the individual currents.

Advantageously, the individual single modules are each equipped with individual energy-supplying electrical link circuits so that the individual modules mainly draw only active power from the supplying energy source. In a non-limiting embodiment, the individual link circuits are equipped with energy-storing device.

Furthermore, advantageously, the individual excitation coils of the individual modules are electrically connected or isolated from one another in such a way that no excessively high voltages can occur between the windings.

DETAILED DESCRIPTION

Figure 1:
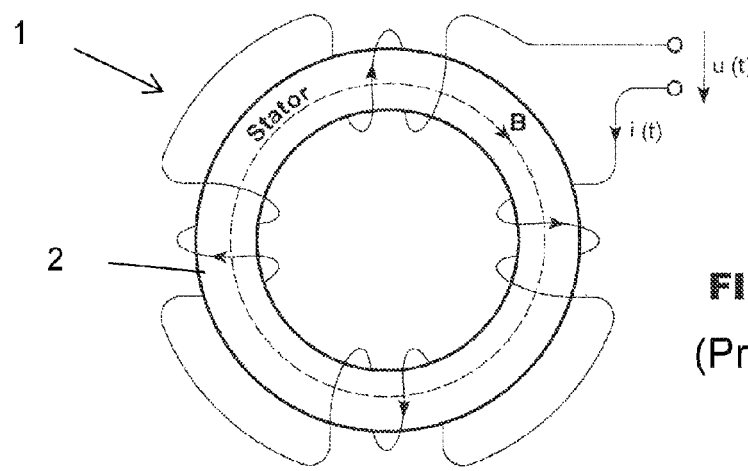
FIG. 1 shows a device belonging to the prior art.

FIG. 1 shows a conventional device 1. This figure therefore in particular shows the annular stator 2 of a hydro generator in schematic form. The rotor is removed for this test. The windings of an excitation coil are arranged around this stator ring. For large stator diameters, individual coil segments are typically distributed symmetrically along the stator circumference for this purpose.

The excitation coil is operated with alternating voltage at mains frequency. With large generators, considerable voltages and currents and a large inductive reactive power are required in order to achieve the required nominal induction of 1.5 Tesla. Typical voltage values are several kV at a current strength of several kA, which means a reactive power requirement of several MVAr (energy content approx. 450 J/m3 and reactive power 2*50*450 Ws/s=45 kVAr/m$^3$). This high reactive power requirement is one of the main problems when carrying out this measurement.

Figure 2:
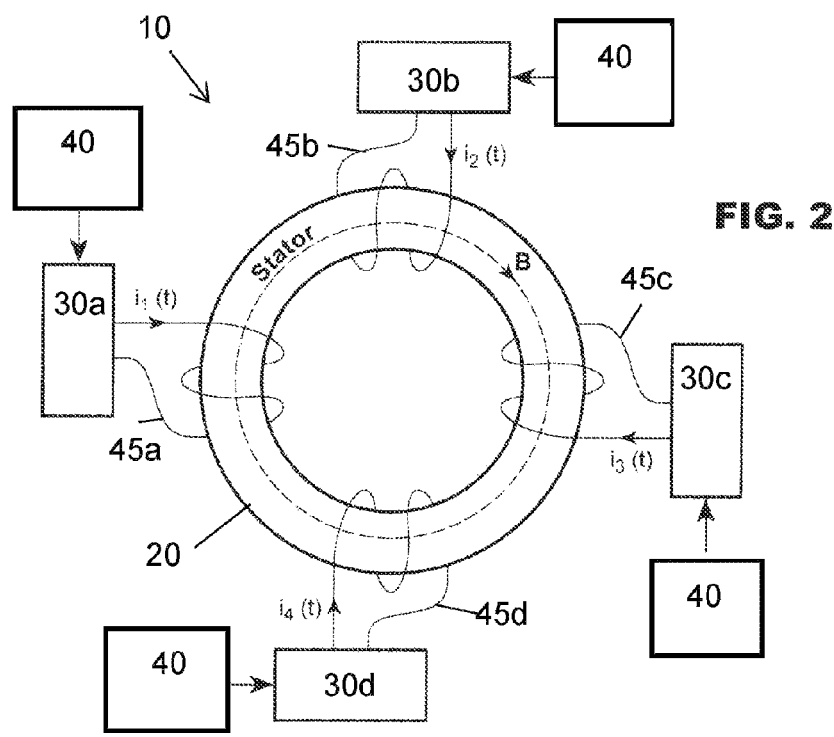
FIG. 2 shows an excitation device having four excitation modules.

FIG. 2 shows an excitation device 10 having four individual single excitation modules 30a-30d. All individual modules 30a-30d are supplied from the same 400 Vrms energy source 40. The individual modules 30a-30d generate the electrical currents $i_1$, $i_2$, $i_3$, $i_4$, which flow through the associated individual excitation windings 45a-45d. The total excitation current is given by superimposing the individual currents.

The individual excitation windings 45a-45d themselves are not electrically connected to one another. However, there can be an electrical connection of the individual windings via the electronics of the excitation modules 30a-30d or via their connections to the common energy source. However, this connection is devised in such a way that there is no electrical series connection of the individual windings 45a-45d, so that the individual winding voltages do not add together and therefore no excessively high voltages can occur between the windings 45a-45d. The use of heavy medium-voltage cables is therefore unnecessary.

An important characteristic of the device 10 is to be seen in that the individual excitation modules 30a-30d have an output current controller 80. They therefore act as current sources and supply the required output current regardless of the load situations occurring at any one time. This is important to implement a uniform current distribution of the total excitation current between the modules. Without an effective current controller, the output currents would be highly dependent on the different impedances of the individual windings, the different voltage levels of the link circuits, the different switch characteristics, etc.

In order to simplify the current control, the individual modules advantageously have an output filter which to some extent dynamically isolates the current control circuit of the individual module from the overall excitation circuit. Typically, this filter comprises at least a series inductor in the output circuit or, in an improved embodiment, R, L, C filters with series arrangements of inductors and parallel arrangements of capacitors.

Furthermore, a monitoring circuit, which feeds back the load conditions, typically the voltage across the respective individual excitation coils which is driven by the individual excitation module, to the individual controller, can be arranged for improved control.

Each of the individual modules 30a-30d has its own energy store, which in each case can absorb part of the total reactive energy which occurs when the laminated core is excited.

In a particular embodiment, an individual module can drive a plurality of individual excitation windings via individual current controllers in each case, wherein a common intermediate energy store is used. In a non-limiting embodiment, the excitation wingings of the individual excitation moduldes have an electric circuit which minimizes a voltage between the excitation windings.

The current setpoints of the individual excitation modules are typically obtained from a central control module 100 (FIG. 3) which outputs a sinusoidal current setpoint, for example, to the individual modules 30a-30d. Advantageously, all sub-modules have the same current demand. Furthermore, the central control module 100 can be connected to sensors, by means of which the magnetic state of the laminated core can be measured, e.g. the magnetic flux in the stator core.

However, the individual modules can also be designed so that they themselves generate an alternating current with specified frequency and specifiable time characteristics or amplitude. In this case, a simple time synchronization device, which effects a synchronous current output of the individual modules, is sufficient. Among other things, this requires that the phase angle of the current output of the individual modules can be manipulated.

Figure 3:
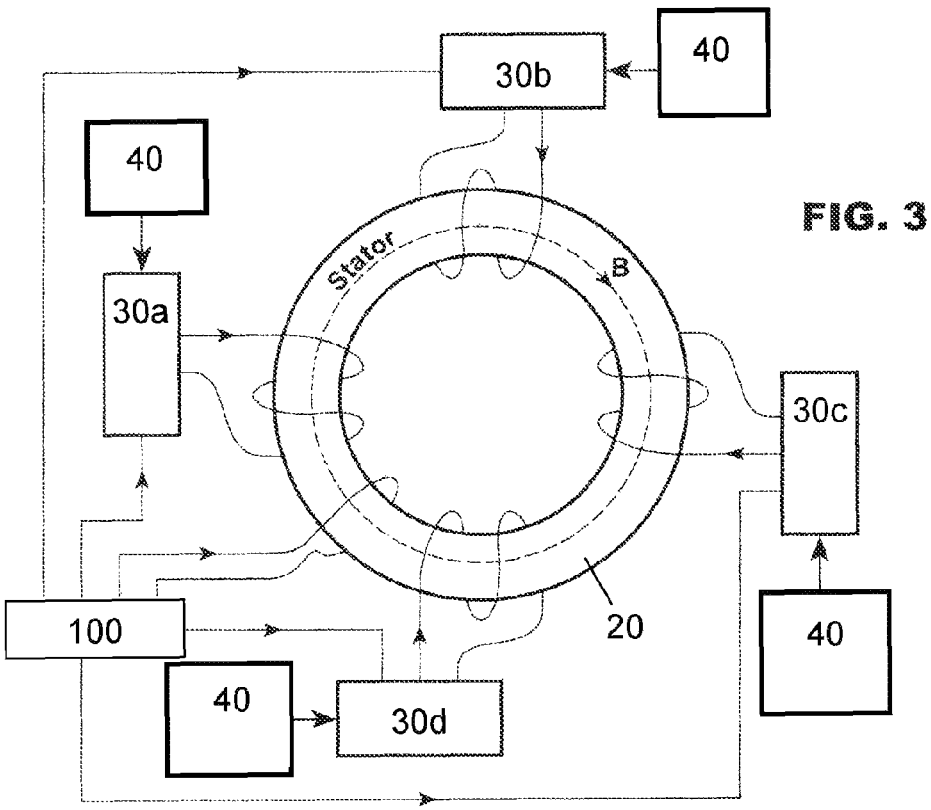
FIG. 3 shows an individual excitation module.
Figure 4:
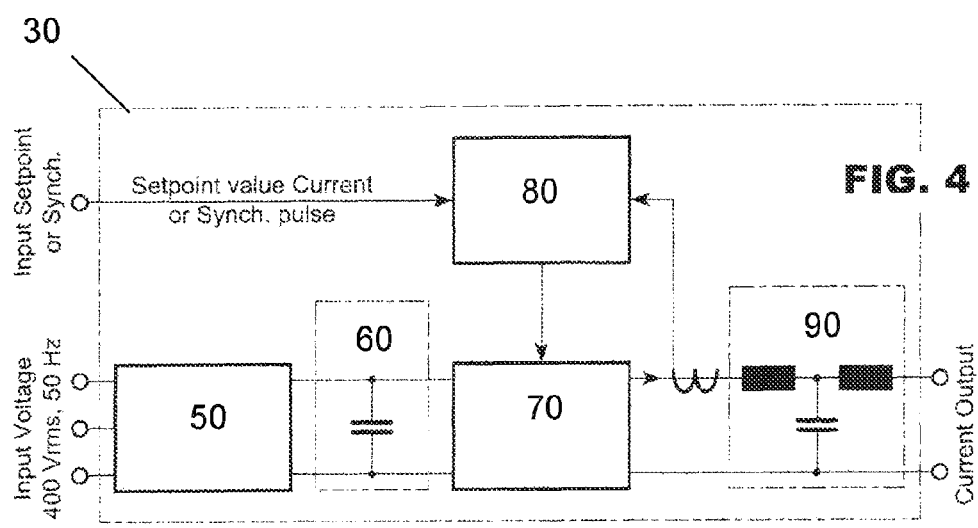
FIG. 4 shows an individual excitation module with two coil outputs.

The individual excitation modules 30a-30d according to FIG. 3 typically include the following function blocks which can be seen qualitatively from FIG. 4:

The input AC/DC converter 50: this converts the alternating input voltage into a DC quantity, typically a DC voltage. Advantageously, the input circuit and the output circuit of this converter can be galvanically isolated from one another in order to guarantee higher personnel safety against electric shock on the load side. The input converter 50 can be supplied from two or more phases.

Energy storage 60: This function block is used for storing the reactive energy which occurs transiently. Typically, the energy is stored in capacitors.

The output DC/AC converter 70: this converts the direct voltage of the link circuit into an alternating quantity, typically an output voltage. The time characteristic of this alternating quantity can be manipulated by means of a control input.

The current controller 80: the controller 80 controls the output converter in such a way that the required output current i(t) is generated in the form of a control variable according to the applied setpoint. The setpoint is fed in via an appropriate input.

The output filter 90: this can optionally be arranged to dynamically decouple the control variable i(t) to a certain extent from the voltage which appears across the excitation coil, and thus ease the control task.

In the meantime, another version of the individual module 30 is shown in FIG. 4. This variant can drive two excitation coils independently of one another, wherein, however, only a single intermediate energy store 60 and a single input converter 50 are used. Output converter 70, controller 80 and filter 90 are duplicated. The number of these output blocks can be increased so that further coils can be operated independently of one another.

This variant can advantageously be used when a large-scale distribution of the excitation coils is not required. This version is therefore intrinsically well suited for a turbogenerator. The use of a plurality of these multiple output modules can also provide advantages for large-scale distributed arrangements, as it is possible to work with further reduced supply voltages and winding voltages.

In a further advantageous version, the individual converter has a galvanically isolated input stage (galvanically isolated AC/DC input converter) and one or more output stages which act in a switchable manner as controllable, regulated current sources or controllable, regulated voltage sources. This enables a current source output to be connected in series with one or more voltage source outputs in order to achieve higher voltage levels.

Calculation Examples

Generator

An excitation of 20,000 Ampere turns is required in order to achieve a core induction of 1.5 Tesla. At the same time, a voltage of 470 V per turn again occurs (1 $m^2$ core area).

Excitation Device a):
One (1) winding and a single converter with the following data:
Winding: 10 turns
Converter:
Output current: 2000 Ampere
Output voltage: 4700 V Excitation Device b):
Four (4) converters with individual outputs and four (4) individual windings with the following data:
Individual winding: 5 turns
Converter:
Output current: 1000 Ampere
Output voltage: 2350 V Excitation Device c):
Four (4) converters with triple outputs; 12 individual windings with the following data:
Individual winding: two (2) turns
Converter:
Output current per individual winding: 833.3 Ampere
Total output current per converter: 3×833.3 Ampere
Output voltage: 940 V Excitation for an Implemented System:
Core approx. 5 $m^2$ (7 m×0.7 m) Cross-section: . . . 2.5 kV/turn
Mean radius: 1.3 m . . . d=2.6 m 8 m circumference . . . approx. 3500 Ampere turns The devices are distinguished as follows:

The overall excitation device comprises a plurality of sub-modules, which each supply part of the excitation current, and a plurality of sub-windings which are connected to these sub-modules.

Each of the sub-modules is designed as a complete converter which converts the input voltage, has a link circuit for energy storage, and supplies the required output current.

On the output side, the sub-modules act as current sources which supply the partial excitation current regardless of the load voltage occurring at any one time.

The time characteristic of the output current of the sub-module is controlled via a control input.

The current outputs of the sub-modules of the excitation device are controlled so that the required total excitation current flows.

In a preferred version, the output stages of the individual module can act as current sources and also, alternatively, as voltage sources, wherein the method of operation can be selected by means of a switch.

In a further preferred embodiment, the outputs are galvanically isolated from ground and from the voltage inputs.

The device can also be used for other excitation tasks.

LIST OF REFERENCE NUMERALS 1, 10 Device
2, 20 Stator
30a-d Excitation modules
40 400 Vrms energy source
45a-d Individual excitation windings
50 DC/AC input converter
60 Energy storage
70 DC/AC output converter
80 Current controller
90 Output filter
100 Central control module

What is claimed is:

1. An excitation device, for stators of generators for high-induction measurement having a greatest possible compensation of a reactive power requirement, comprising:
a plurality of individual excitation modules with a corresponding plurality of individual excitation windings arranged around the stator, and there is no electrical series connection of the individual excitation windings, wherein
each of the individual excitation modules produces an individual current which flows in its respective excitation winding, and all of the individual currents of the excitation windings are superimposed in the stator to produce a necessary total excitation current for the stator, and the individual excitation modules each have an output current controller, and the output current controllers control respective individual excitation modules to act as current sources regardless of a load voltage occurring at any one time and supply required output current regardless of load situations, and the output current is generated in the form of a control variable according to a setpoint.

2. The excitation device as claimed in claim 1, wherein the individual excitation module is coupled to a number of excitation turns.

3. The excitation device as claimed in claim 2, wherein part of the total excitation current required is provided by the excitation winding.

4. The excitation device as claimed in claim 1, wherein the individual excitation modules have a controlled and mutually synchronizable output current feed.

5. The excitation device as claimed in claim 1, wherein a total current required flows in a time characteristic by superimposing the individual currents of the excitation windings.

6. The excitation device as claimed in claim 1, wherein the individual excitation module draws an individually required active power from a supplied energy source.

7. The excitation device as claimed in claim 1, wherein the excitation windings of the individual excitation modules have electrical circuits which are isolated from one another.

8. The excitation device as claimed in claim 1, wherein the individual excitation module has its own energy store, which absorbs at least part of a total reactive energy which occurs.

9. The excitation device as claimed in claim 1, wherein the individual excitation module has an output filter that filters current outputted from the individual excitation module.

10. The excitation device as claimed in claim 9, wherein the output filter comprises a series inductor.

11. The excitation device as claimed in claim 10, wherein the output filter comprises a series arrangement of inductors and a parallel arrangement of capacitors.

\* \* \* \* \*

UNITED STATES PATENT AND TRADEMARK OFFICE
CERTIFICATE OF CORRECTION

PATENT NO. : 9,293,955 B2
APPLICATION NO. : 13/535742
DATED : March 22, 2016
INVENTOR(S) : Max Hobelsberger Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 443 days.

Signed and Sealed this
Fourteenth Day of June, 2016

Michelle K. Lee
*Director of the United States Patent and Trademark Office*